(12) United States Patent
Wong

(10) Patent No.: US 10,606,791 B1
(45) Date of Patent: Mar. 31, 2020

(54) ADAPTATION OF A BUS BRIDGE TRANSFER PROTOCOL

(71) Applicant: INTERNATIONAL BUSINESS MACHINES CORPORATION, Armonk, NY (US)

(72) Inventor: Kelvin Wong, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/251,354

(22) Filed: Jan. 18, 2019

(51) Int. Cl.
*G06F 13/42* (2006.01)
*G06F 13/40* (2006.01)

(52) U.S. Cl.
CPC ...... *G06F 13/4282* (2013.01); *G06F 13/4027* (2013.01); *G06F 13/4217* (2013.01)

(58) Field of Classification Search
CPC ............. G06F 13/4027; G06F 13/4282; G06F 13/4217
See application file for complete search history.

(56) References Cited

U.S. PATENT DOCUMENTS

| | | | |
|---|---|---|---|
| 5,450,591 A | 9/1995 | Palmer | |
| 5,832,241 A * | 11/1998 | Guy | G06F 13/4004 710/112 |
| 6,081,859 A | 6/2000 | Munguia | |
| 6,757,767 B1 | 6/2004 | Kelleher | |
| 7,047,372 B2 | 5/2006 | Zeitler et al. | |
| 7,174,410 B2 * | 2/2007 | Drerup | G06F 13/4027 710/105 |
| 9,336,173 B1 | 5/2016 | Sodke et al. | |
| 10,255,218 B1 * | 4/2019 | Tse | G06F 13/20 |
| 2006/0190655 A1 * | 8/2006 | Kautzman | G06F 13/4027 710/306 |
| 2015/0254207 A1 | 9/2015 | Kessler | |
| 2019/0065426 A1 * | 2/2019 | Das Sharma | G06F 13/4027 |

OTHER PUBLICATIONS

Bhatt, "Creating a Third Generation I/O Interconnect", Intel® Developer Network for PCI Express* Architecture, www.express-lane.org, Jul. 2002, pp. 1-11.

* cited by examiner

*Primary Examiner* — Glenn A. Auve
(74) *Attorney, Agent, or Firm* — Richard A. Wilhelm

(57) ABSTRACT

Embodiments are directed to a bus bridge transfer protocol in a bus bridge system that uses a tag based transfer protocol to identify transactions. The bus bridge may receive a protocol request from an initiator that does not use the tag based transfer protocol. A designated tag consistent with the tag based transfer protocol may be assigned for use in requests from the non-tag conforming initiator. When receiving a request from the non-tag conforming initiator, an initiator flag is set to indicate that the request is from the non-tag conforming initiator and that the response should be forwarded to the non-tag conforming initiator. When receiving a request from a tag conforming initiator, if the request includes the designated tag, the initiator flag is set to indicate that the response should be forwarded to and that the designated tag is being used in a request from the tag conforming initiator.

20 Claims, 6 Drawing Sheets

US 10,606,791 B1

ADAPTATION OF A BUS BRIDGE TRANSFER PROTOCOL

BACKGROUND

Embodiments relate to adaptation of a bus bridge transfer protocol, and more specifically, to adaptation for handling transfer protocol tags.

Many data transfer protocols such as Peripheral Component Interconnect (PCI) or Open Coherent Accelerator Processor Interface (OpenCAPI) use tags to identify discrete transactions in a transaction layer. In OpenCAPI, for example, a 16-bit "tag" value is assigned to each command by an agent initiating a data transfer request on the protocol.

In known arrangements, an initiator agent communicates with a bridge using a tag based protocol such as PCI or OpenCAPI and on the other side of the bridge multiple target agents are connected which communicate with the bridge using the same tag based protocol. Each target controls a resource that the initiator needs to access, such as system memory or a processing unit. When the initiator starts a read or write to a target, it sends to the bridge an address and a unique tag to identify the transaction. The bridge determines from the address which target is being accessed and forwards the request along with the tag to that particular target. Targets will typically fulfill the requests in the order they arrive and ensure that order by maintaining a queue of requests. When the target completes a given request it will return a status packet back to the bridge, which then sends this back to the initiator. The status packet will contain the tag that came with the request so that the initiator knows the transaction completed. If the transaction was a read, the status packet may also contain the read data.

SUMMARY

According to an aspect of the present invention there is provided a computer-implemented method for adaptation of a bus bridge transfer protocol in a bus bridge system that uses a tag based transfer protocol to identify discrete transactions, comprising: configuring a bus bridge to receive a protocol request from a non-tag conforming initiator that does not use the tag based transfer protocol by assigning a designated tag consistent with the tag based transfer protocol for use in protocol requests from the non-tag conforming initiator; when receiving a protocol request from the non-tag conforming initiator, setting an initiator flag that indicates that the designated tag is being used in a request from the non-tag conforming initiator and that the response should be forwarded to the non-tag conforming initiator; and when receiving a protocol request with the designated tag from a tag conforming initiator, setting an initiator flag that indicates that the designated tag is being used in the tag conforming initiator request from the tag conforming initiator and that the response should be forwarded to the tag conforming initiator.

According to another aspect of the present invention there is provided a system for adaptation of a bus bridge transfer protocol in a bus bridge system that uses a tag based transfer protocol to identify discrete transactions, comprising: a processor and a memory configured to provide computer program instructions to the processor to execute the function of the components: a configuration component for configuring a bus bridge to receive a protocol request from a non-tag conforming initiator that does not use the tag based transfer protocol including a tag assigning component for assigning a designated tag consistent with the tag based transfer protocol for use in protocol requests from the non-tag conforming initiator; a non-tag request receiving component for receiving a protocol request from the non-tag conforming initiator, and an initiator flag component for setting an initiator flag that indicates that the designated tag is being used in a request from the non-tag conforming initiator and that the response should be forwarded to the non-tag conforming initiator; and a tag request receiving component with a tag reading component for receiving a protocol request with the designated tag from a tag conforming initiator, and an initiator flag component for setting an initiator flag that indicates that the designated tag is being used in the tag conforming initiator request from the tag conforming initiator and that the response should be forwarded to the tag conforming initiator.

According to a further aspect of the present invention there is provided a computer program product for adaptation of a bus bridge transfer protocol in a bus bridge system that uses a tag based transfer protocol to identify discrete transactions, the computer program product comprising a computer readable storage medium having program instructions embodied therewith, the program instructions executable by a processor to cause the processor to: configure a bus bridge to receive a protocol request from a non-tag conforming initiator that does not use the tag based transfer protocol by assigning a designated tag consistent with the tag based transfer protocol for use in protocol requests from the non-tag conforming initiator; when receiving a protocol request from the non-tag conforming initiator, setting an initiator flag that indicates that the designated tag is being used in a request from the non-tag conforming initiator and that the response should be forwarded to the non-tag conforming initiator; and when receiving a protocol request with the designated tag from a tag conforming initiator, setting an initiator flag that indicates that the designated tag is being used in the tag conforming initiator request from the tag conforming initiator and that the response should be forwarded to the tag conforming initiator.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A technical problem arises when an initiator that does not use a tag based protocol may be added to a tag based protocol system. The initiator could, for example, use a simple request-acknowledge protocol to send read or write requests to the targets behind the bridge. In the request-acknowledge protocol, the initiator would raise the request line to initiate a transaction and the bridge would pulse the acknowledge line to indicate that it has completed the request. This scenario could occur when integrating Intellectual Property (IP) from different sources into a single integrated circuit (IC). The initiator and target agents could be different pieces of IP and a logic designer would have to design a bridge section capable of communicating with each agent.

Since the targets require a tag to be associated with a transaction, the bridge section could arbitrarily choose and assign a tag to the non-tag protocol initiator request. However, since the bridge has no control over the values of tags used by a tag based protocol initiator for its transactions and cannot predict which tags will be used there is a chance that the tags associated for transactions for both initiators could be the same when they are both simultaneously sending requests. Since the tags would no longer be unique, in this circumstance, a subsequent status packet could get routed back to the wrong initiator.

The described method and system relate to incorporating the operation of an agent that does not use a tag based data transfer protocol in a system that uses tags to identify discrete transactions. On receipt of a request at a bus bridge from the agent using a non-tag protocol, a specific tag that is consistent with the tag based protocol is assigned to the request. If at any time, a request is received from an agent using a tag based protocol that uses this same specific tag, a flag is set at the bus bridge that indicates that the tag is being used in a tag agent request. When a response is received at the bridge with this tag, the set flag indicates that the response should be forwarded to the tag agent.

Figure 1:
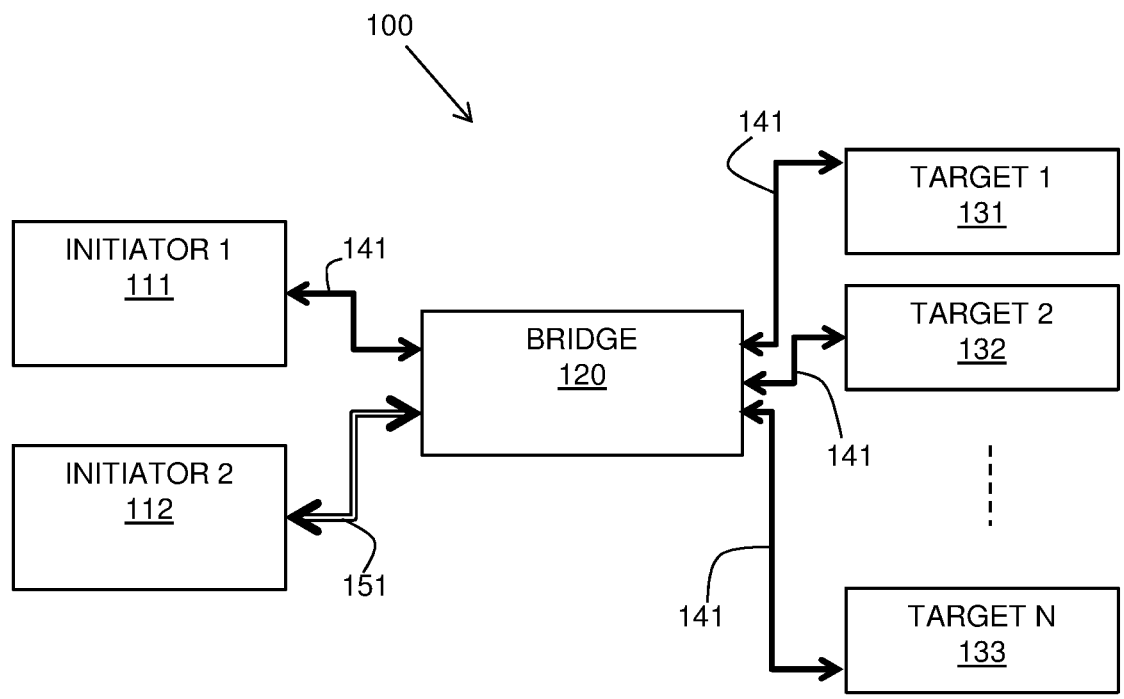
FIG. 1 is a schematic diagram of a processor bridge showing the context of the present invention.

The described method and system is implemented in a bus bridge 120 as shown in the schematic diagram of an example system 100 of FIG. 1. The bus bridge 120 may be a hardware device that connects between local buses on which data transfer protocols are used that attach hardware devices in a computer. The bus may support the functions found on a processor bus in a standardized format that is independent of a particular processor native bus.

Many data transfer protocols use tags to identify discrete transactions in a transaction layer. There are many tag based protocols including, as examples, International Business Machine Corporation's PowerBus, Advanced eXtensible Interface (AXI), Peripheral Component Interconnect (PCI), and Open Coherent Accelerator Processor Interface (OpenCAPI). For example, an agent initiating a data transfer request on the protocol may assign a 16-bit "tag" value to each command.

Referring to the system 100 of FIG. 1, a first initiator, Initiator 1 111, may use a tag based protocol 141 and a second initiator, Initiator 2 112, may use a non-tag based protocol 151, such as a simple request-acknowledge protocol. A bus bridge 120 may connect to N target agents 131, 132, 133, which also use the same tag based protocol 141 as the first initiator 111.

The described method and system allow requests from the different initiators 111, 112 with the same tag value to be correctly managed. It is assumed in the embodiment described here that Initiator 2 112 can only have one command outstanding. However, the method can be extended to cover Initiator 2 112 having the capability of having multiple commands outstanding commands. The method may also be extended to allow more than two initiators 111, 112 to have access to the bus bridge 120 and these initiators 111, 112 could be a mix of tag based protocol and non-tag based protocol initiators.

Whenever a request from the non-tag based initiator, Initiator 2 112, arrives it is assigned a tag by the bus bridge 120, say tag X, so that the request becomes compatible with the tag based protocol used by the targets 131-133. Tag X is a valid tag value in the set of tags available in the tag based protocol 141.

Figure 2:
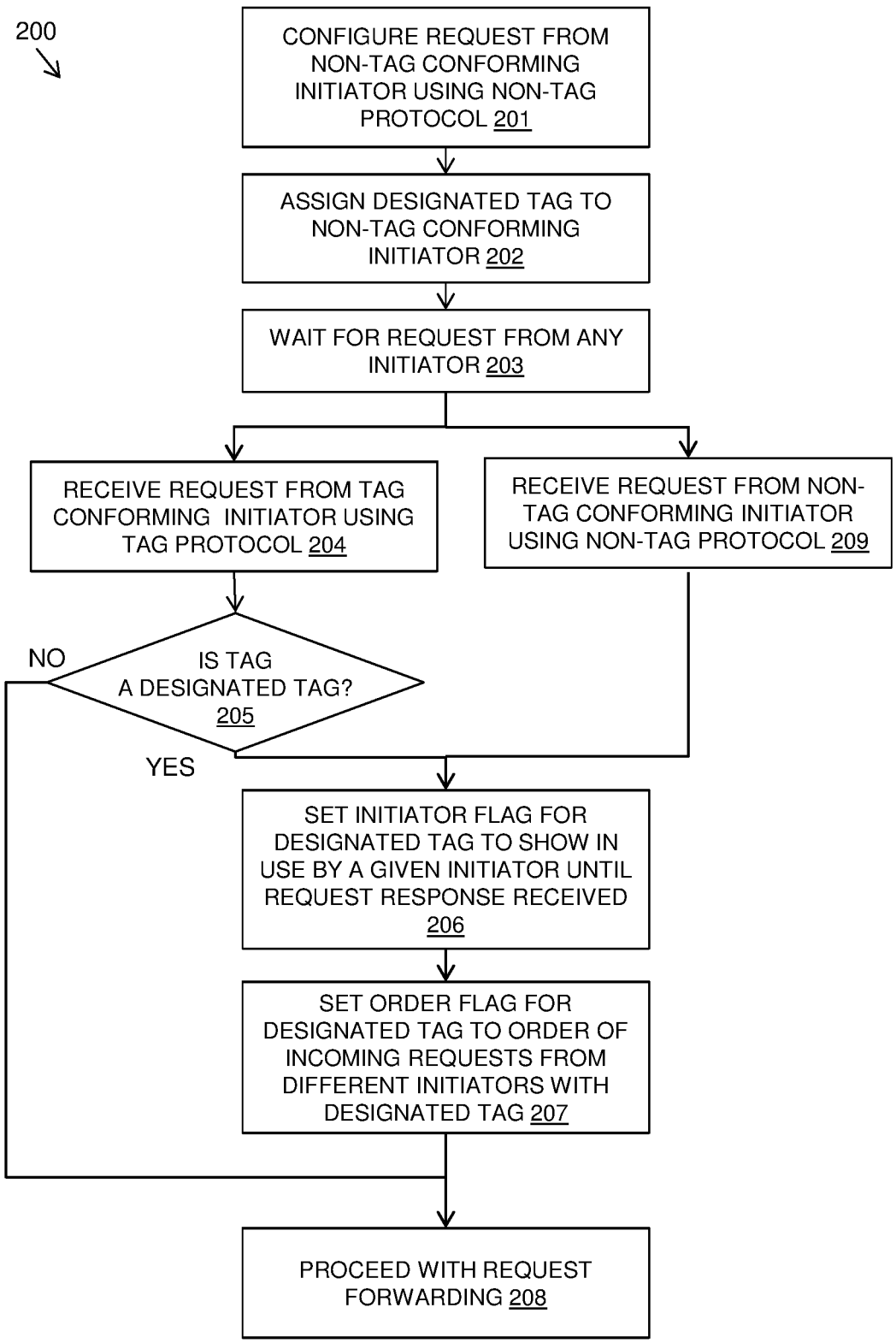
FIG. 2 is a flow diagram of an example embodiment of an aspect of a method in accordance with the present invention.

Referring to FIG. 2, a flow diagram 200 shows an example embodiment of the described method as carried out at a bus bridge 120 that uses a tag based transfer protocol to identify discrete transactions.

The bus bridge 120 may be configured 201 for request from a non-tag conforming initiator that does not use the tag based transfer protocol by assigning 202 a designated tag to the non-tag conforming initiator for use in all requests from that initiator.

The method may wait 203 for a request from any initiator. When a request is received 204 from a tag conforming initiator using the tag protocol, it is determined 205 if the tag is a designated tag for a non-tag conforming initiator. If it is not a designated tag, the method may proceed with request forwarding 208 without setting a flag in the request.

If the tag of the request from a tag conforming initiator is a designated tag for a non-tag conforming initiator, the method may set 206 an initiator flag for the designated tag to show that the designated tag is in use by a given initiator as indicated in the flag and the method may clear the initiator flag once the request response is forwarded to the initiator. The method may also set 207 an order flag for the designated tag to order incoming requests from different initiators using the same designated tag and may clear the order tag once it is not longer needed. The request may then be forwarded 208 to the target.

When a request is received 209 from a non-tag conforming initiator, the request has a designated tag assigned to the non-conforming initiator. The method may set 206 an initiator flag for the designated tag to show that the designated tag is in use by a given initiator as indicated in the flag and the method may clear the initiator flag once the request response is forwarded to the initiator. The method may also set 207 an order flag for the designated tag to order incoming requests from different initiators using the same designated tag and may clear the order tag once it is not longer needed. The request may then be forwarded 208 to the target.

Referring back to the system of FIG. 1 in the context of the described method of FIG. 2 with a designated tag X for requests from Initiator 2 112. Whenever a request from Initiator 1 111 arrives at the bus bridge 120, the bus bridge 120 determines the tag being used. If the tag is not equal to X, then the request is forwarded to the appropriate target 131-133 as normal. If the request uses tag X, an initiator flag called "X_1" is set to 1. This flag is used to indicate that there is a request from Initiator 1 111 that is currently outstanding which uses tag X. This initiator flag is reset to 0 when the status packet for this request is sent back to Initiator 1 111.

Whenever a request from Initiator 2 112 arrives at the bridge 120, an initiator flag called "X_2" is set to 1 to indicate that there is a request from Initiator 2 112 that is currently outstanding. In an embodiment, all Initiator 2 112 requests will be assigned tag X. This flag is reset to 0 when the status packet for this request is sent back to Initiator 2 112.

If a request from Initiator 1 111 using the tag X arrives at the bridge 120, this could potentially clash with an incoming Initiator 2 112 request. To handle this, a further order flag is used to record the order that the requests from Initiator 1 111 and Initiator 2 112 arrive in. This order flag is called "Next_X_is_1".

If the Initiator 1 111 tag X request arrives at the bridge 120 first, "Next_X_is_1" is set to 1 and the request is forwarded to the appropriate target 131-133. When the first status packet with tag X returns from the target 131-133, the "Next_X_is_1" flag being 1 indicates that the packet should be routed to Initiator 1 111. The "Next_X_is_1" flag may get reset to 0 depending on whether a command from Initiator 2 112 arrived while the Initiator 1 111 command was still outstanding.

If the Initiator 2 112 request arrives at the bridge 120 first, "Next_X_is_1" is reset to 0 and the request forwarded to the appropriate target 131-133. When the first status packet with tag X returns from the target 131-133, the "Next_X_is_1" flag being 0 indicates that the packet should be routed to Initiator 2 112. The "Next_X_is_1" flag may get set to 1 depending on whether a command from Initiator 1 111 using tag X arrived while the Initiator 2 112 command was still outstanding.

If a request from Initiator 1 111 (using tag X) and Initiator 2 112 arrive at the bridge 120 simultaneously, the bridge 120 arbitrates to decide which request is to be sent to the target 131-133 first and appropriate sets or resets "Next_X_is_1".

Figure 3:
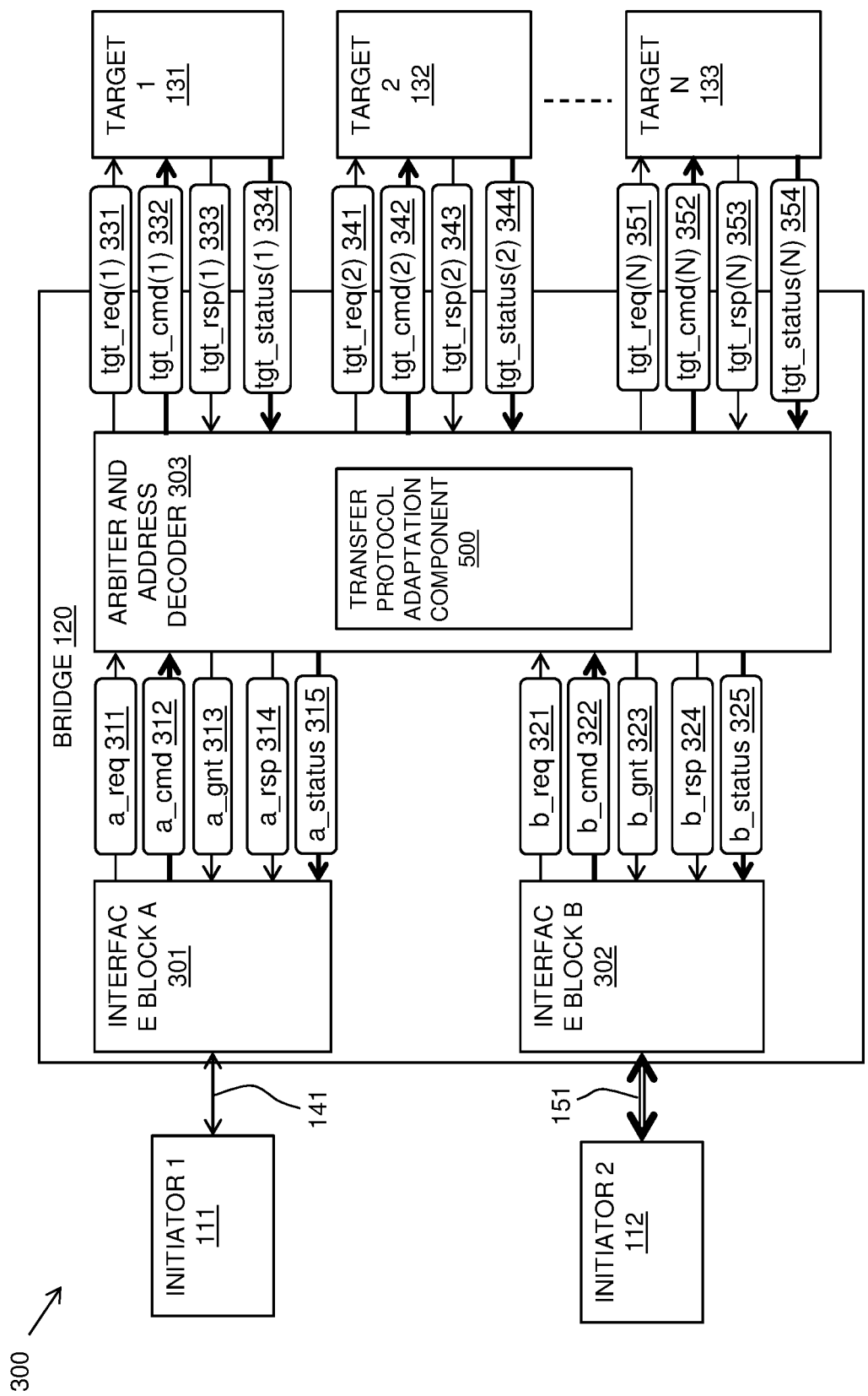
FIG. 3 is block diagram of an example embodiment of an aspect of a system in accordance with the present invention.

FIG. 3 shows further details of a described embodiment 300 in the context of the system 100 of FIG. 1. The bus bridge 120 includes an Interface Block A 301 that communicates with Initiator 1 111 using the tag based protocol 141 and an Interface Block B 302 that communicates with Initiator 2 112 using the non-tag based protocol 151. The bus bridge 120 also includes an arbiter and address decoder 303 that may include a transfer protocol adaptation component 500 described further with reference to FIG. 5.

When a request is received from Initiator 1 111, Interface Block A 301 asserts "a_req" signal 311 to arbitrate for this request to be forwarded to the appropriate target 131-133. At the same time it drives details of the request e.g. address, tag, direction of data transfer (read or write), write data (if any) on the "a_cmd" bus 312. This "a_req" signal 311 is held high until the arbiter 303 asserts a one cycle pulse on the "a_gnt" signal 313 to indicate to Interface Block A 301 that its request has been granted.

On granting the request the arbiter 303 decodes from the address which target the request is for; Target n 131-133 (1<=n<=N, where N is the total number of targets). It then forwards the command details presented on "a_cmd" 312 onto the "tgt_cmd(n)" bus 332, 342, 352. The arbiter 303 is connected to each target 131-133 via a dedicated request line "tgt_req(n)" 331, 341, 351. The arbiter 303 will one cycle pulse the tgt_req(n) signal 331, 341, 351 of the appropriate target 131-133. When target n 131-133 detects the assert of its own "tgt_req(n)" signal 331, 341, 351, it will record the command details (which include address, tag, direction of transfer, etc.) from the "tgt_cmd(n)" bus 332, 342, 352 into its own command queue. Note that these command details, including the tag, are the same details, unchanged, sent by Initiator 1 111. "a_gnt" 313 is then pulsed to acknowledge to Interface Block A 301 that its request has been forwarded.

Similarly, there is an Interface Block B 302 that communicates with Initiator 2 112 using the non-tag based protocol. When a request is received from Initiator 2 112, Interface Block B 302 asserts "b_req" signal 321 to arbitrate for this request to be forwarded to the appropriate target 131-133. At the same time, it drives details of the request e.g. address direction of data transfer, write data (if any) on the "b_cmd" bus 322. This "b_req" signal 321 is held high until the arbiter 303 asserts a one cycle pulse on the "b_gnt" signal 323 to indicate to Interface Block B 302 that its request has been granted.

On granting the request from Interface Block B 302, the arbiter's actions are similar as for granting requests from Interface Block A 301. The arbiter 303 will decode the request address, similar to the Interface Block A 301 grant case, in order to determine which Target (n) 131-133 this request belongs to. The details of the command on "b_cmd" bus 322 are driven onto the "tgt_cmd(n)" bus 332, 342, 352, only this time the arbiter 303 will assign a fixed tag value, X, to the request (since Initiator 2 112 does not use the tag based protocol) and it will drive this on the "tgt_cmd(n)" bus 332, 342, 352 along the with other command details. It will then pulse "tgt_req(n)" 331, 341, 351 and "b_gnt" 323.

The arbiter 303 may use a fairness algorithm to determine which request from Interface Block A 301 or Interface Block B 302 to grant.

The tag value of X must be a tag value that is compatible with the tag based protocol used by Initiator 1 111 and the targets 131-133. The tag value of X may be pre-determined when the arbiter 303 is designed or may be pre-programmed into the arbiter 303 when it is initialized. If the tag value of X is pre-programmed when it is initialized, the value may be different between system power cycles and remains the same while the system is powered up.

When a target 131-133 completes a request it sends a status packet back to the bus bridge 120, which includes the original tag for the request, success or fail status for the request and read data (if appropriate). Each target (1<=n<=N) can drive the status details back to the arbiter 303 on a dedicated "tgt_status(n)" bus 334, 344, 354 and will one cycle pulse its own "tgt_rsp(n)" 333, 343, 353 line to indicate the "tgt_status(n)" bus 334, 344, 354 is valid.

The arbiter 303 then forwards the status packet back to the appropriate initiator 111, 112.

To forward status back to Initiator 1 111, the arbiter 303 forwards the status details from "tgt_status(n) 334, 344, 354 onto the "a_status" bus 315 back to Interface Block A 301 and one cycle pulses a signal called "a_rsp" 314 to indicate the status is valid. Interface Block A 301 then uses the tag based protocol 141 to return the status back to Initiator 1 111. Note that the status will contain the tag originally assigned by Initiator 1 111 so that the status can be associated with the request.

Forwarding status for a request from Initiator 2 112 is done similarly. The arbiter 303 forwards the status details from "tgt_status(n)" 334, 344, 354 onto the "b_status" bus 325 to Interface Block B 302 and one cycle pulses a signal called "b_rsp" 324 to indicate the status is valid. Interface Block B 302, in turn, forwards status of its request back to Initiator 2 112 using the non-tag based protocol 151. Note that there is no need to forward the tag X back to Initiator 2 112 since this is not used by Initiator 2 112 and was assigned by the arbiter 303 in order for the request to be compatible with the tag based protocol 141 used by the targets 131-133.

The arbiter 303 will examine the tag in the packet to determine which initiator 111, 112 the status packet must be forwarded to. If the tag does not equal to X then the packet must correspond to a request from Initiator 1 111 and so the packet is sent back to that initiator 111.

The arbiter 303 uses the initiator flags and order flags to handle the requests that have the same tag X. The X_1 and X_2 flags indicate that Initiator 1 and 2 have requests tagged with X outstanding. Next_X_is_1 indicates which one is the earliest request of these.

If the Tag=X then the arbiter 303 will use the Next_X_is_1 flag in order to determine which initiator 111, 112 the status packet belongs to. When Next_X_is_1=0 the packet must be forwarded to Initiator 2 112; when Next_X_is_1=1 the packet must be forwarded to Initiator 1 111. The Next_X_is_1 flag is used because, if the tag is X then Next_X_is_1 indicates the initiator whose request (tagged with X) arrived first and therefore which initiator the first response packet with Tag X should get sent to.

Figure 4:
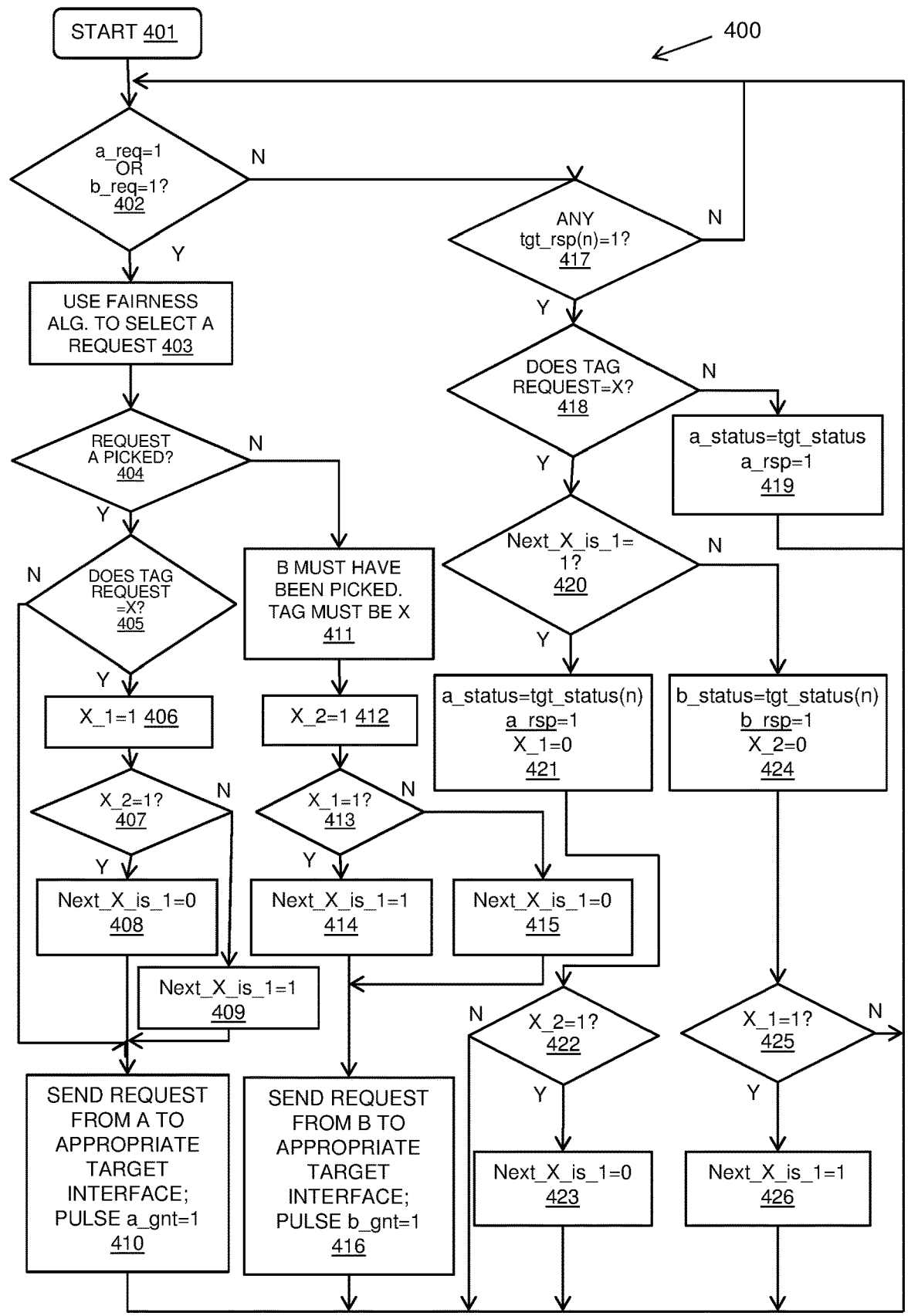
FIG. 4 is a flow diagram of an example embodiment of an aspect of a method in accordance with the present invention.

Referring to FIG. 4, a flow diagram 400 shows a detailed example embodiment of the described method.

The method at the bus bridge 120 may start 401 and it may be determined 402 if there are incoming requests from initiators a_req=1 or b_req=1. Initiators communicate with the Interface Blocks A and B 301, 302 and when these blocks detect an incoming request from either initiator they cause a_req=1 and b_req=1 respectively. When incoming requests are detected, a fairness algorithm may be used to select 403 one of the requests.

It is determined 404 if request (a_req) is selected from Initiator 1 111 that uses the tag based protocol and is received at Interface Block A 301. It is therefore determined 405 if the request uses tag X, a designated tag for a non-tag protocol conforming initiatior (such as Initiator 2 112). If the request does not use tag X, the method may send 410 the request from Interface Block A 301 to the appropriate target 131-133 interface and may pulse agnt=1.

If the request from Initiator 1 111 does use tag X, an initiator flag may be set "X_1=1" 406 to indicate that tag X is in use for a request by Initiator 1 111. It is also determined 407 if there is already an initiator flag set for "X_2=1" that indicates that tag X is in use for a request by Initiator 2 112. If the initiator flag "X_2=1" is not set, this means that there is not already a request using tag X from Initiator 2 112 and therefore the order flag "Next_X_is_1=1" 409 is set to indicate that the request from Initiator 1 should be handled first. If the initiator flag "X_2=1" is set, this means that there is already a request using tag X from Initiator 2 112 and therefore the order flag "Next_X_is_1=0" 408 is set to indicate that the request from Initiator 1 111 should not be handled first.

The method may then send 410 the request from Interface Block A 301 to the appropriate target 131-133 interface and may pulse a_gnt=1.

Going back to the determination step 404 of whether the request (a_req) is selected from Initiator 1 111, if it is not selected, then the request (b_req) must have been selected 411 from Initiator 2 112 by the fairness algorithm and the tag must therefore be tag X designated for requests from Initiator 2 112 as it is using a non-tag protocol.

An initiator flag may be set "X_2=1" 412 to indicate that tag X is in use for a request by Initiator 2 112. It is also determined 413 if there is already an initiator flag set for "X_1=1" that indicates that tag X is in use for a request by Initiator 1 111. If the initiator flag "X_1=1" is not set, this means that there is not already a request using tag X from Initiator 1 111 and therefore the order flag "Next_X_is_1=0" 415 is set to indicate that the request from Initiator 1 should not be handled first. If the initiator flag "X_1=1" is set, this means that there is already a request using tag X from Initiator 1 111 and therefore the order flag "Next_X_is_1=1" 414 is set to indicate that the request from Initiator 1 111 should be handled first.

The method may then send 416 the request from Interface Block B 302 to the appropriate target 131-133 interface and may pulse bgnt=1.

Going back to the determination step 402, if no new requests from Initiator 1 or Initiator 2 are raised then 417 determines if one of the targets 131-133 has sent a response by asserting its tgt_rsp 333, 343, 353.

If there are no such responses then the method goes back to 402. If there is such a response, it is determined 418 whether the tag associated with it is X. If it is not X, then the response must be for a request initiated by Initiator 1 419 and the tgt_status 334, 344, 354 of the appropriate target 131, 132 or 133 is forwarded to Interface Block A using a_status 315. a_rsp 314 one cycle pulses so that Interface Block A knows that the response is to be routed back to Initiator 1.

If at 418 the tag is determined to be X, it is tested 420 whether the Next_X_is_1 flag=1. If it is, then the response must be for a request initiated by Initiator 1 421 and the tgt_status 334, 344, 354 of the appropriate target 131, 132 or 133 is forwarded to Interface Block A using a_status 315. a_rsp 314 one cycle pulses so that Interface Block A knows that the response is to be routed back to Initiator 1. The X_1 flag is set to 0 to indicate that Initiator 1 no longer has an outstanding request labelled with Tag X.

The X_2 flag is then tested 422. If X_2=1 then there is still an outstanding request from Initiator 2 using Tag X so make Next_X_is_1=0 423 since the next response with Tag X sent from targets 131-133 will be for Initiator 2. Then the method goes back to 402 to start another loop. If at 422, X_2=0 then there is no outstanding request from Initiator 2, so the method loops back to 402 to start another loop.

Going back to 420, if Next_X_is_1=0 then the response detected at 417 is for a request initiated by Initiator 2 424 the tgt_status 334, 344, 354 of the appropriate target 131, 132 or 133 is forwarded to Interface Block B using b_status 325. b_rsp 324 one cycle pulses so that Interface Block B knows that the response is to be routed back to Initiator 2. The X_2 flag is set to 0 to indicate that Initiator 2 no longer has an outstanding request labelled with Tag X.

The X_1 flag is then tested 425. If X_1=1 then there is still an outstanding request from Initiator 1 using Tag X so make Next_X_is_1=1 426 since the next response with Tag X sent from targets 131-133 will be for Initiator 1. Then go back to 402 to start another loop. If at 425, X_1=0 then there is no outstanding request from Initiator 2, so loop back to 402 to start another loop.

FIG. 4 details the algorithm which the arbiter 303 uses to manage the value of Next_X_is_1 via the use of two subsidiary flags: X_1 and X_2. When X_1=1 this indicates that a request with tag X from Initiator 1 has been forwarded to a target and that a status packet for that request is pending. When X_2=1 this indicates that a request from Initiator 2 has been given a tag value of X and forwarded to a target and that a status packet for that request is pending.

The described method can be expanded for a non-tag based protocol initiator (Initiator 2) that is capable of issuing multiple outstanding transactions. For an initiator that may have two commands outstanding, for example, two tags: X and Y could be assigned from the set of available tags in the protocol, by the bridge, to Initiator 2 transactions. Just as flags X_1, X_2 and Next_X_is_1 are used to manage Tag X transactions from both Initiators, there would be flags Y_1, Y_2 and Next_Y_is_1 to manage Tag Y transactions.

The described method solves the problem involving interfacing a node, which does not use a tag based protocol, into a tag based protocol environment and dealing with the scenario where tags for requests from this node may clash with tags for requests from other nodes. It also deals with the ordering of transactions in that system when identical transaction tags are used.

While it is possible that each initiator could be assigned its own unique set of tags, which is mutually exclusive to the set belonging to the other initiator, it may be impractical to arrange this since both initiators could represent pieces of IP sourced from different manufacturers/designers to be integrated into a single integrated chip. Initiator 1 may have been designed to conform to the tag based protocol thus allowing it to use any tag within the set of tags available to the protocol. This, in turn, implies that any possible set of tags that could be assigned to Initiator 2 will overlap with those assigned to Initiator 1. It may not be possible reverse engineer the IP of Initiator 1 to affect or determine which tags it uses.

The described method has the advantage over this possible solution in that there is no need to restrict Initiator 1 from using any tag in the set of possible tags available in the tag based protocol. This in turn means there is no need to commit extra engineering effort to reverse engineer or modify Initiator 1.

Another possible solution to this problem is for the bridge to have its own unique set of tags. The size of this set would be equal to the maximum number of commands that both initiators could have outstanding. The bridge could reserve a subset of these unique tags to be assigned to incoming commands from Initiator 2. The remainder could then be used for Initiator 1. When a command arrives from Initiator 1, the bridge would have to store in local memory a look up table, which would associate an incoming tag from Initiator 1 with a new tag assigned by the bridge. The bridge would then forward this new tag to the appropriate target. When receiving a status packet back from that target it would look up the tag in the packet in the table in memory to determine the original tag that the Initiator assigned and it would also be able to deduce which Initiator the tag belongs to.

The drawback of this possible solution is that the bridge must have an additional memory store in order to hold this tag look up table. This inevitably involves greater cost and, in the case of an integrated chip, greater area and power requirements, which again leads to more cost. In many cases this may not be a viable solution. Furthermore there could be a performance degradation due to having to do the look up.

The described method has the advantage over this second possible solution in that there is no need to build in a look up table into the bridge, which would otherwise increase the amount of design effort and cost required for the bridge.

Figure 5:
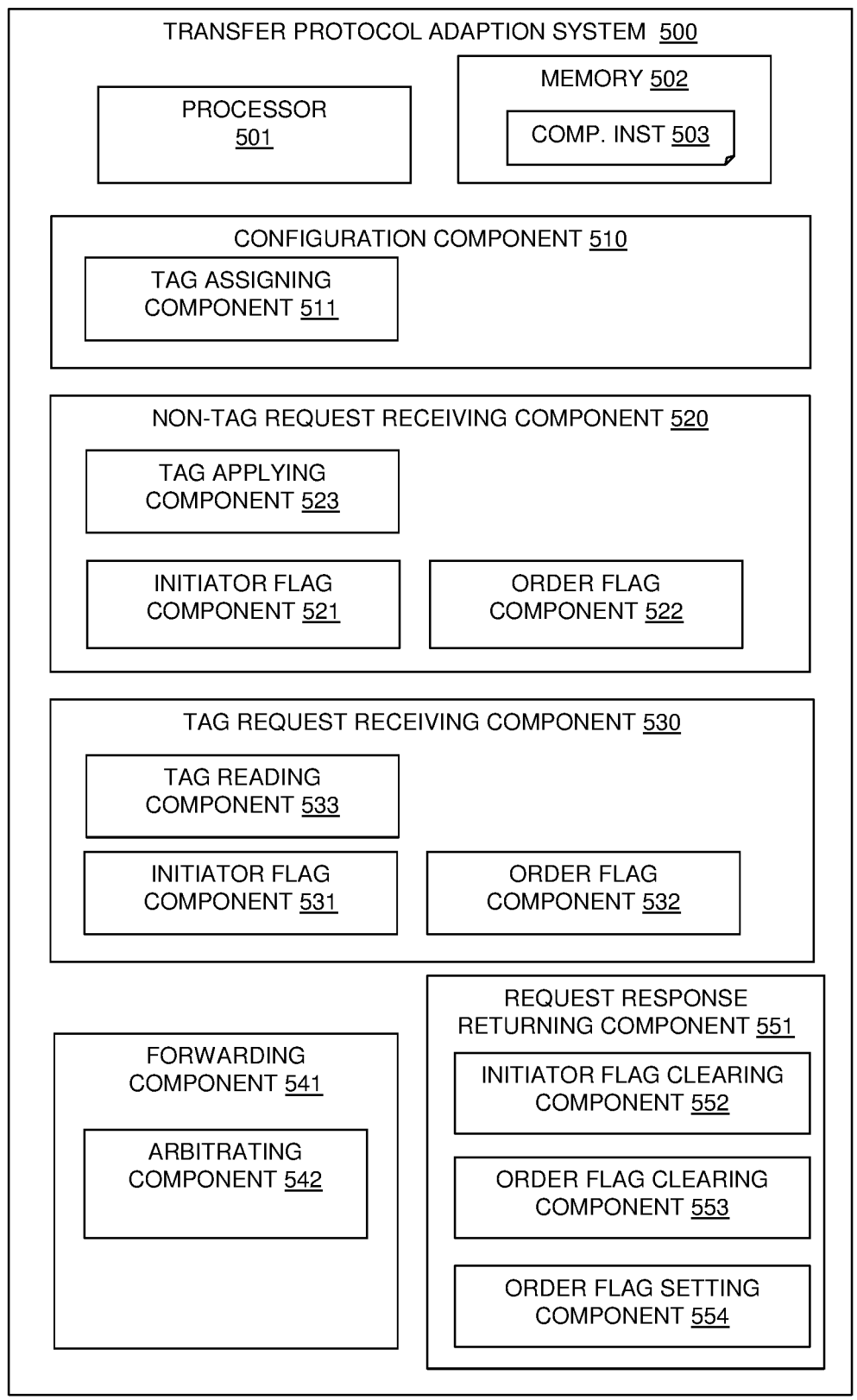
FIG. 5 is a block diagram of an example embodiment of an aspect of a system in accordance with the present invention.

Referring to FIG. 5, a block diagram shows an example transfer protocol adaptation system 500 for adaptation of a bus bridge transfer protocol in a bus bridge 120. The transfer protocol adaptation system 500 may be provided as part of an arbiter and address decoder 303 as described in FIG. 3.

The system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The system 500 includes a configuration component 510 for configuring the bus bridge to receive a protocol request at a bus bridge from a non-tag conforming initiator that does not use the tag based transfer protocol. The configuration component 510 includes a tag assigning component 511 for assigning a designated tag consistent with the tag based transfer protocol for use in protocol requests from the non-tag conforming initiator. The tag assigning component 511 is capable of assigning multiple designated tags for multiple transactions from the non-tag conforming initiator.

The system 500 includes a non-tag request receiving component 520 for receiving a protocol request from the non-tag conforming initiator. The non-tag request receiving component 520 includes a tag applying component 523 for applying an assigned designated tag to the request. The non-tag request receiving component 520 includes an initiator flag component 521 for setting an initiator flag that indicates that the designated tag is being used in a request from the non-tag conforming initiator and an order flag component 522 for setting an order flag for the requests using the designated tag to indicate an order of the requests from different the initiators.

The system 500 includes a tag request receiving component 530 with a tag reading component 533 for determining if a received request from a tag conforming initiator uses a designated tag assigned to a non-tag conforming initiator. The tag request receiving component 530 includes an initiator flag component 531 for setting an initiator flag that indicates that the designated tag is being used in the tag conforming initiator request and that the response should be forwarded to the tag conforming initiator. The tag request receiving component 530 includes an order flag component 532 for setting an order flag for the requests using the designated tag to indicate an order of the requests.

The system 500 includes a forwarding component 541 for forwarding the received protocol requests to one of a plurality of attached targets using the tag based protocol and a request response returning component 551 for receiving request responses back from the targets.

The forwarding component 541 includes an arbitrating component 542 for applying an arbitrating process when more than one protocol request is received simultaneously and the order flag components 522, 532 set an order flag indicating the arbitrated protocol request order.

The request response returning component 551 returns a request response to a non-tag conforming initiator by identifying the assigned tag and initiator flag and includes an initiator flag clearing component 552 for clearing an initiator flag once a response to the request is forwarded to the requesting initiator, an order flag clearing component 553 for clearing an order flag when a status response from a target is received, and an order flag setting component 554 for setting an order flag when a status response is received.

Figure 6:
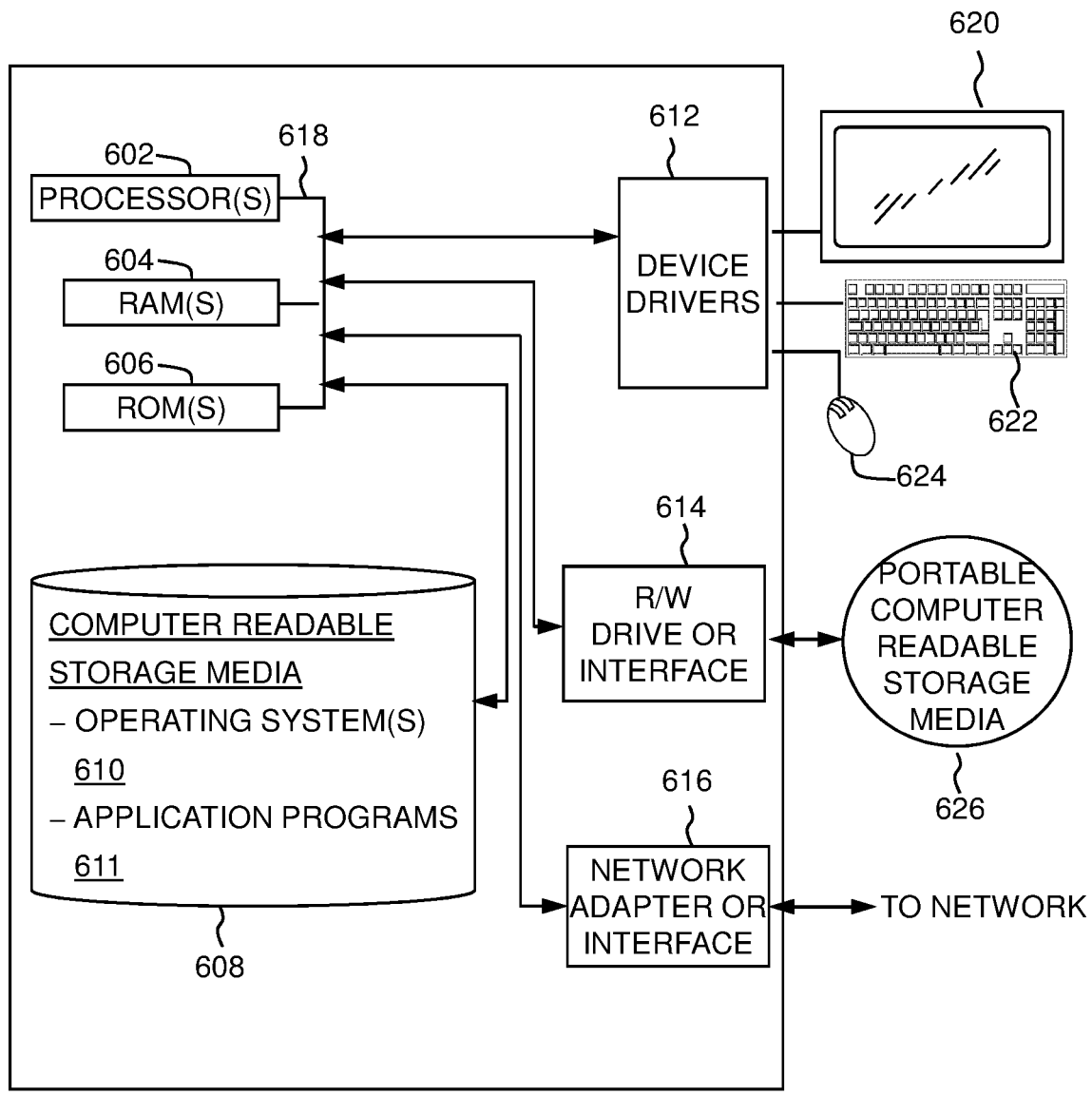
FIG. 6 is a block diagram of an embodiment of a computer system in which the present invention may be implemented.

FIG. 6 depicts a block diagram of components of the computing device of in which the bridge system 120 of FIG. 1 may be incorporated in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 614 to read from and write to one or more portable computer readable storage media 626. Application programs 611 on computing device can be stored on one or more of the portable computer readable storage media 626, read via the respective R/W drive or interface 614 and loaded into the respective computer readable storage media 608.

Computing device can also include a network adapter or interface 616, such as a TCP/IP adapter card or wireless communication adapter. Application programs 611 on computing device can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing device can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for adaptation of a bus bridge transfer protocol in a bus bridge system that uses a tag based transfer protocol to identify discrete transactions, comprising:
   configuring a bus bridge to receive a protocol request from a non-tag conforming initiator that does not use the tag based transfer protocol by assigning a designated tag consistent with the tag based transfer protocol for use in protocol requests from a non-tag conforming initiator;
   in response to receiving a protocol request from the non-tag conforming initiator, setting an initiator flag that indicates that the designated tag is being used in a request from the non-tag conforming initiator and that a response should be forwarded to the non-tag conforming initiator; and
   in response to receiving a protocol request with the designated tag from a tag conforming initiator, setting the initiator flag to indicate that the designated tag is being used in the tag conforming initiator request from the tag conforming initiator and that a response should be forwarded to the tag conforming initiator.

2. The method of claim 1, further comprising:
   in response to receiving a protocol request from the non-tag conforming initiator or the tag conforming initiator using the designated tag, setting an order flag for the requests using the designated tag to indicate an order of the requests from initiators.

3. The method of claim 2, wherein the order flag is set dependent on whether there is an outstanding request using the designated tag and indicating a request to be handled first.

4. The method of claim 2, further comprising applying an arbitrating process when more than one protocol request is received simultaneously and setting an order flag indicating the arbitrated protocol request order.

5. The method of claim 2, further comprising:
   setting or clearing an order flag when a status response from a target is received.

6. The method of claim 1, further comprising:
   forwarding the received protocol requests to an attached target using the tag based protocol and receiving request responses back from the target; and
   returning a request response to a non-tag conforming initiator by identifying the assigned tag and initiator flag.

7. The method of claim 1, further comprising:
   clearing an initiator flag once a response to the request is forwarded to one of the non-tag conforming initiator or the tag conforming initiator.

8. The method of claim 1, further comprising determining if a received request from a tag conforming initiator uses a designated tag assigned to a non-tag conforming initiator and, if not, allowing the request to proceed with no initiator flag set.

9. The method of claim 1, wherein the non-tag conforming initiator is capable of issuing multiple outstanding transactions with multiple tags assigned for the non-tag conforming initiator.

10. The method of claim 1, wherein the tag based protocol is one of: Peripheral Component Interconnect (PCI) or Open Coherent Accelerator Processor Interface (OpenCAPI), and the non-tag based protocol is a request-acknowledge protocol.

11. A system for adaptation of a bus bridge transfer protocol in a bus bridge system that uses a tag based transfer protocol to identify discrete transactions, comprising:

a processor and a memory configured to provide computer program instructions to the processor;

a configuration component for configuring a bus bridge to receive a protocol request from a non-tag conforming initiator that does not use the tag based transfer protocol including a tag assigning component for assigning a designated tag consistent with the tag based transfer protocol for use in protocol requests from a non-tag conforming initiator;

a non-tag request receiving component for receiving a protocol request from the non-tag conforming initiator, and an initiator flag component for setting an initiator flag that indicates that the designated tag is being used in a request from the non-tag conforming initiator and that a response should be forwarded to the non-tag conforming initiator; and a tag request receiving component with a tag reading component for receiving a protocol request with the designated tag from a tag conforming initiator, wherein the initiator flag component is additionally for setting the initiator flag to indicate that the designated tag is being used in the tag conforming initiator request from the tag conforming initiator and that a response should be forwarded to the tag conforming initiator.

12. The system of claim 11, further comprising:
an order flag component for, when receiving a protocol request from the non-tag conforming initiator or the tag conforming initiator using the designated tag, setting an order flag for the requests using the designated tag to indicate an order of the requests from initiators.

13. The system of claim 12, wherein the order flag component sets the order flag dependent on whether there is an outstanding request using the designated tag and indicating a request to be handled first.

14. The system of claim 12, further comprising an arbitrating component for applying an arbitrating process when more than one protocol request is received simultaneously and the order flag components sets an order flag indicating the arbitrated protocol request order.

15. The system of claim 12, further comprising an order flag clearing component for clearing an order flag when a status response is received from a target and an order flag setting component for setting an order flag when a status response is received from a target.

16. The system of claim 11, further comprising:
a forwarding component for forwarding the received protocol requests to an attached target using the tag based protocol and receiving a request response back from the target; and
a request response returning component for returning a request response to a non-tag conforming initiator by identifying the assigned tag and initiator flag.

17. The system of claim 11, further comprising an initiator flag clearing component for clearing an initiator flag once a response to the request is forwarded to one of the non-tag conforming initiator or the tag conforming initiator.

18. The system of claim 11, wherein the tag reading component is for determining if a received request from a tag conforming initiator uses a designated tag assigned to a non-tag conforming initiator and, if not, allowing the request to proceed with no initiator flag set.

19. The system of claim 11, wherein the tag assigning component is capable of assigning multiple designated tags for multiple transactions from the non-tag conforming initiator.

20. A computer program product for adaptation of a bus bridge transfer protocol in a bus bridge system that uses a tag based transfer protocol to identify discrete transactions, the computer program product comprising a computer readable storage medium having program instructions embodied therewith, the program instructions executable by a processor to cause the processor to:

configure a bus bridge to receive a protocol request from a non-tag conforming initiator that does not use the tag based transfer protocol by assigning a designated tag consistent with the tag based transfer protocol for use in protocol requests from the non-tag conforming initiator;

in response to receiving a protocol request from the non-tag conforming initiator, setting an initiator flag that indicates that the designated tag is being used in a request from the non-tag conforming initiator and that a response should be forwarded to the non-tag conforming initiator; and in response to receiving a protocol request with the designated tag from a tag conforming initiator, setting an initiator flag that indicates that the designated tag is being used in the tag conforming initiator request from the tag conforming initiator and that a response should be forwarded to the tag conforming initiator.

* * * * *